UNITED STATES PATENT OFFICE.

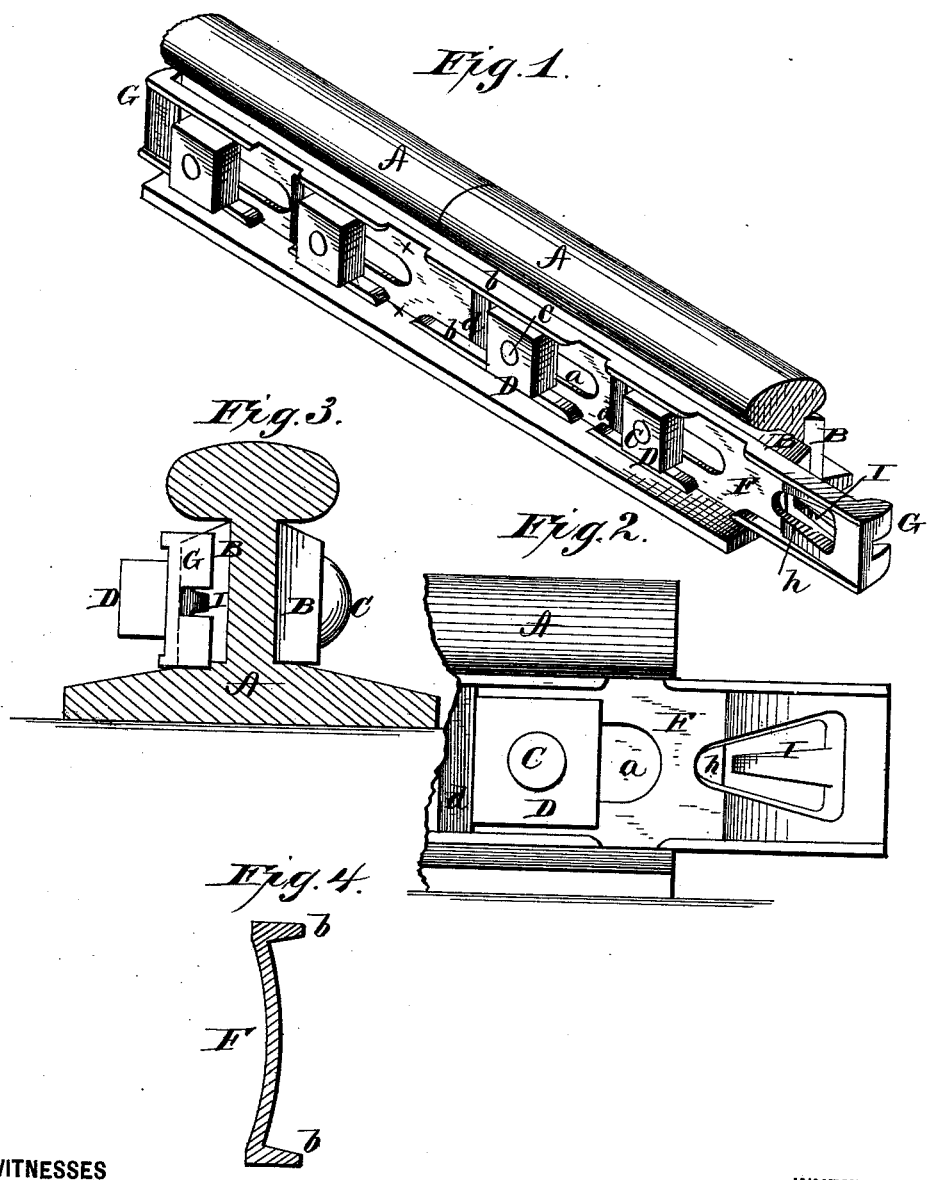

JOHN LEE, OF ORRVILLE, ASSIGNOR OF ONE-HALF OF HIS RIGHT TO PETER G. ALBRIGHT, OF MASSILLON, OHIO.

IMPROVEMENT IN NUT-LOCKS.

Specification forming part of Letters Patent No. 222,513, dated December 9, 1879; application filed September 4, 1879.

*To all whom it may concern:*

Be it known that I, JOHN LEE, of Orrville, in the county of Wayne, and in the State of Ohio, have invented certain new and useful Improvements in Nut-Locks; and I do hereby declare that the following is a full, clear, and exact description thereof, reference being had to the accompanying drawings, and to the letters of reference marked thereon, making a part of this specification.

The nature of my invention consists in the construction of a device for locking nuts on bolts at railroad-joints, which will be hereinafter more fully set forth.

In order to enable others skilled in the art to which my invention appertains to make and use the same, I will now proceed to describe its construction and operation, referring to the annexed drawings, in which—

Figure 1 is a perspective view of a railroad-joint embodying my invention. Fig. 2 is an enlarged side view of a part thereof. Fig. 3 is an end view of the same. Fig. 4 is a cross-section of the locking-bar.

A A represent the adjacent ends of two railroad-rails. B B are the fish-bars; C C, the bolts, and D D the nuts.

F represents the locking-bar, which is provided with longitudinal slots $a\ a$, one for each bolt, and of such width that the bar can be placed over the ends of the bolts before the nuts are put on. The bar F is, at the top and bottom edges, provided with outwardly-projecting flanges $b\ b$, in which are made openings $x\ x$, as shown.

When the bar F is first placed over the ends of the bolts the bolts should be at one end of their respective slots and opposite the centers of the openings $x$ in the flanges $b$. The nuts D can then be screwed up tightly and the bar F is then knocked, by a hammer or other suitable instrument, lengthwise as far as the slots $a$ will admit, when the nuts will be confined between the flanges $b\ b$, and cannot be turned. A third bearing is furnished for each nut by means of cross-ribs $d$, as shown.

The bar F is made concavo-convex in cross-section, as shown in Fig. 4, which gives it a certain elasticity, and at the same time causes it to form bearings against the nut only at two points, thus reducing the friction and lessening the power necessary to move the said bar either in locking or unlocking the nuts.

To prevent the bar F from moving back after the nuts have been locked, as above described, the end of the bar is formed with an opening at $h$, and in said opening is a longitudinal tongue, I, having sufficient spring to extend rearward at an angle, so as to come against the end of the fish-bar, which will effectually prevent any movement of the locking-bar.

When it is desired to remove the nuts the tongue I is pressed forward, when the bar F can be knocked back until the openings $x$ in the flanges $b$ coincide with the nuts, and the nuts can then be unscrewed.

Each end of the locking-bar F is enlarged and extended rearward to form, as it were, a head, G, upon which the blow is struck in moving the bar both for locking and unlocking. These heads strengthen the bar and prevent it from being bent.

It will be noticed that the upper edges of the fish-bars B are beveled downward and outward, as shown at $i$ in Fig. 3, so that when the head of the rail becomes battered or bent down it will virtually lock the fish-bar in place and make the joint equally as strong as the body of the rail.

I am aware that a slotted fish-plate has been made with irregular projections for locking the bolt-nuts, and I do not claim such as my invention.

Having thus fully described my invention, what I claim as new, and desire to secure by Letters Patent, is—

1. The locking-bar F, constructed as described, and provided at one end with the opening $h$ and spring-tongue I, in combination with the fish-bar, rails, bolts, and nuts, substantially as and for the purposes herein set forth.

2. The combination, in a railroad-joint, with the fish-bar and a series of bolts and nuts, of the locking-bar F, provided with slots $a$, flanges $b$, cross-ribs $d$, heads G, opening $h$, and spring-tongue I, substantially as and for the purposes herein set forth.

In testimony that I claim the foregoing I have hereunto set my hand this 29th day of August, 1879.

JOHN LEE.

Witnesses:
  H. AUBREY TOULMIN,
  FRANK GALT.